Patented Apr. 6, 1943

2,315,766

UNITED STATES PATENT OFFICE 2,315,766

SOLUTIZER PROCESS FOR THE REMOVAL OF MERCAPTANS

Lawson E. Border, Wood River, Ill., assignor to Shell Development Company, San Francisco, Calif., a corporation of Delaware No Drawing. Application May 26, 1941, Serial No. 395,233

7 Claims. (Cl. 196—30).

This invention relates to the art of refining hydrocarbons by extraction with alkaline solutizer solutions, and more particularly to an improvement in the solutizer process for sweetening gasoline, comprising a simple pretreatment step.

It is known that mercaptans and other weak organic acids contained in sour hydrocarbon distillates, and more particularly in gasoline distillates, can be extracted with aqueous solutions of alkali metal hydroxides. In this separation of weak organic acids from their solutions in organic substantially water-insoluble liquids, such as hydrocarbon liquids, by extraction with aqueous solutions of strong bases, e. g., alkali metal hydroxides, the presence of solubility promoters or solutizers for the weak organic acids greatly enhances the efficiency of the extraction.

Solutizers have been defined as organic substances which, when in the liquid state, are good solvents for the weak organic acids to be separated, e. g., mercaptans, phenols, etc., are substantially insoluble in the organic water-immiscible liquid, are soluble in the aqueous solution of the strong base, are chemically inert to the action of the strong base even at elevated temperatures of steam stripping, and have boiling temperatures preferably substantially higher than water. Among the several compounds particularly suitable as solutizers for weak organic acids are the following: aliphatic alkanolamines and amino alkylamines, in which the alkylene radicals contain 2 to 3 carbon atoms; diamino alcohols, glycols and amino glycols of 3 to 5 carbon atoms; alkyl glycerines in which the number of carbon atoms in the alkyl radical is from 1 to 4; monoalkyl ethers of glycerine in which the alkyl radical has from 1 to 3 carbon atoms; diamino, dihydroxy, or amino hydroxy alkyl ethers, thioethers or imino ethers in which the alkyl radicals have from 2 to 3 carbon atoms; alkali and particularly potassium salts of fatty acids having from 1 to 6 carbon atoms, or of amino or hydroxy fatty acids having from 3 to 7 carbon atoms, or of phenyl acetic acid, or of dicarboxylic acids having from 5 to 11 carbon atoms in which the carboxyl radicals are separated by at least two carbon atoms, or of phenols or alkyl phenols; mixtures of the above and particularly mixtures with gum inhibitors soluble in aqueous caustic alkali solutions. Outstanding among the above are the salts, because in the regeneration of the spent solution containing absorbed weak organic acids by steam stripping, salts are substantially non-volatile.

The procedure in extracting weak inorganic acids from hydrocarbon distillates or other water-immiscible organic liquids with solutized aqueous solutions of caustic alkalis is quite simple. A sour hydrocarbon distillate, for instance, is contacted in an extractor with the aqueous caustic alkali solution, e. g. a 2 to 10 normal KOH or NaOH solution, containing the solutizer in an effective amount, and the two resulting liquids are then separated. The separated aqueous solution is subjected to a steam stripping to expel absorbed mercaptans, and the stripped solution is returned to the extractor to contact further amounts of sour distillate.

The solutizing process and the various solutizers enumerated above have been described in a series of patents and patent applications, as well as in the general literature, for example, in the Yabroff et al. U. S. Patents 2,149,379, 2,149,380, 2,152,166, 2,152,720, 2,152,723, 2,164,851, 2,186,398, 2,202,039, 2,223,798, and 2,229,995; Refiner and Natural Gasoline Manufacturer, May 1939, pages 171 to 176; and March 1940, pages 73 to 76; Industrial and Engineering Chemistry, vol. 32, pages 257 to 262, February 1940; Chemical and Metallurgical Engineering, vol. 47, pages 776 to 778, November 1940; Oil and Gas Journal, vol. 39, No. 26, pages 55 to 56, November 7, 1940, etc.

The potassium salt of isobutyric acid dissolved in potassium hydroxide solution has been found to be one of the best solutizers of a large number of combinations studied. The composition of the solution normally used is as follows: potassium hydroxide 6-normal, potassium isobutyrate 3-normal. It may be prepared by neutralizing with isobutyric acid one-third of the KOH in a 9-normal potassium hydroxide solution.

Since sour gasoline may contain besides mercaptans certain acidic substances, namely hydrogen sulfide and organic acids stronger than mercaptans such as alkyl phenols, thiophenols, naphthenic, carboxylic, sulfonic, and alkyl sulfuric acids which would foul the solution and prevent its being regenerated by steaming, it is the general practice to precede the mercaptan extraction proper with a caustic soda wash. The resulting wash containing the salts of the relatively strongly acidic substances usually is removed by settling or, if necessary, with the aid of coalescers, and the washed gasoline is then treated with the solutizer solution.

It has been found that despite a most carefully conducted separation of the washed gasoline from the wash caustic, there remain in the washed gasoline small amounts of certain harmful substances. Upon charging the pretreated gasoline to the mercaptan extraction system the solutizer solution tends to become contaminated in a manner which shall presently be described.

The contaminants which have been observed to accumulate in the solutizer solution are, among others: water-soluble sulfides and the sodium salts of the relatively strongly acidic constituents originally contained in the hydrocarbon distillate. These substances when introduced into the solutizer solution may decrease its activity, form troublesome precipitates, or act as emulsifiers which may prevent a clean separation of the treated gasoline and solutizer solution. If the alkali metal ion of the solutizer solution is potassium, then contamination with sodium salts is particularly undesirable inasmuch as their solubilities are less than those of the corresponding potassium salts. Some of the harmful substances remaining in the caustic pretreated gasoline after separation of the wash caustic may be in the form of a suspension; however, even when the gasoline is completely settled so as to remove all suspended matter, some harmful constituents still remain.

Furthermore, it has been found that the solutizer-treated gasoline leaving the plant, despite precautions, carries with it some of the solutizer-treating solution. This may result in substantial losses in solutizer solution when the throughput of the plant is large.

The purpose of my invention is to improve the solutizer treatment of hydrocarbon distillates. Another purpose is to effect substantial savings by cutting down the losses of solutizer solution and maintaining a high degree of activity in solutizer solutions. A still further purpose is to prevent the gradual buildup in solutizer solutions of contaminating substances, such as sodium ion, organic anions, and solid organic salts. Other purposes will be apparent from the following description.

My invention is based on the discovery that a treatment adapted to remove alkaline water-soluble substances will remove contaminants harmful to a solutizer solution from a caustic soda-washed hydrocarbon distillate, thus facilitating the later extraction of mercaptans from it by means of solutizer solutions.

In carrying out my invention a sour hydrocarbon distillate containing mercaptans and stronger acids is first pretreated with an aqueous caustic soda solution to remove acids stronger than mercaptans. The pretreated distillate is then subjected to a treatment capable of removing water-soluble impurities, and the resulting hydrocarbon distillate is treated with solutizer solution for the purpose of extracting mercaptans.

Hydrocarbon distillates whose treatment may be improved by my process are particularly those boiling in the gasoline range. These may be either cracked or straight-run products or mixtures of the two.

The exact concentration of the soda solution to be used in my pretreatment will depend on the source of the sour hydrocarbon distillate. Thus a gasoline derived from one crude may contain more $H_2S$, and carboxylic or other acids stronger than mercaptans than that from another. Likewise straight-run gasoline normally contains no alkyl phenols, while cracked gasolines are relatively rich in them. Even further, the acid components of the individual fractions of either straight-run or cracked gasoline will differ greatly and the treatment of individual fractions will differ therefore, always keeping in mind that the main purpose for my pretreat is the removal of acids stronger than mercaptan.

Hydrogen sulfide, if present, may be removed with relatively weak caustic, while alkyl phenols usually require relatively strong caustic for their removal. Therefore, if the sour hydrocarbon distillate is subjected to a prefractionation by distillation to produce at least two fractions of different boiling ranges, the strength of the soda in the pretreatment to be given the separate fractions may differ. The lower boiling fraction containing all the $H_2S$ and very few alkyl phenols, if any, will require a light soda treat only, e. g. 8 to 20° Bé. The higher boiling fraction containing substantially all the alkyl phenols but not $H_2S$ will on the other hand require a heavier soda treat, e. g. 30 to 45° Bé.

For example, the caustic treat may be applied to cracked gasolines as follows: Dubbs pressure distillate from which substantially all of the components lighter than $C_4$ hydrocarbons have been removed by stabilization, is distilled to produce two gasoline fractions, one boiling below 300° F., and one boiling from 300° F. to 400° F. The lower boiling fraction and the 300° F. to 400° F. fractions are separately treated with soda, because a very small amount of alkyl phenols are contained in the lower boiling fraction, while the higher boiling fraction contains most of the alkyl phenols. It is convenient and effective to use an 8° Bé. soda solution in pretreating the lower boiling fraction and a 40° Bé. soda solution for the 300° F. to 400° F. fraction.

Treatments capable of removing alkaline water-soluble impurities, which pretreatments follow the caustic pretreatment, may be divided into several groups; namely, washing, adsorbing, and coalescing.

The washing may be carried out by contacting with water substantially free from electrolytes as with dilute aqueous solutions of mineral acids. Care must be taken not to introduce into the solution contaminants which may be contained in the water and which may be as harmful as those it is sought to remove. Thus the water used should be free from Ca, Mg, etc. salts, and therefore the use of tap water, sea water, well water, etc., in general is to be avoided. If available, it is advisable to use steam condensate.

Mineral acids suitable for washing are those which have relatively low oxidation potentials, i. e., not greater than that of sulfuric acid, so that in dilute aqueous solution they are not oxidizing agents. Such acids as hydrochloric, sulfuric, sulfurous, phosphoric, and others in concentrations up to about 5% are satisfactory. Sources of dilute acid solutions other than those prepared from the fresh reagents include recovered acids from other refinery operations and waters which have been used in washing pressure distillate or acid-treated hydrocarbon distillates.

The washing of the pretreated hydrocarbon distillate with water or weak acid solutions may be carried out in any conventional way, for example, by mixing and separating, or by countercurrent contacting.

Suitable adsorbents include clays such as fuller's earths, acid activated bentonites, various acid activated clays, bauxite or alumina, and such substances as ferric hydroxide gel, silicic gel, alumina gel, and combinations of the last two.

It is preferable that the adsorbent used be one which is of an acidic nature, therefore in some instances it may be found desirable to use added chemicals which are acidic in nature such as aluminum sulfate, zinc chloride, and aluminum chloride.

The adsorption may be carried on by any of the conventional methods, such as contact of the hydrocarbon distillate with finely divided adsorbent followed by filtration, or by percolation filtering through a deep bed of adsorbent in granular form.

Coalescers comprise solid substances preferentially wetted by water which act by adsorption to aggregate dispersed droplets of liquid thereby increasing their size until two phases separate under the action of gravity. Coalescers may also act to "facilitate an extration with fixed water." When the coalescer is washed with water at the outset, a thin film of water adheres to the surface of the metal due to preferential wetting. When a soda pretreated hydrocarbon distillate is then contacted with the coalescer, alkaline water soluble substances in it are in effect extracted.

Therefore, it is desirable that coalescers comprise acidic water insoluble solid substances, in addition to being substances which are preferentially wetted by water, because the pretreated distillate is slightly alkaline. These substances should be substantially inert under the conditions of the treatment. In order to be active they should expose as large a surface as practicable, and therefore should consist of relatively small granules, preferably in the form of a filter bed. Suitable substances include among others diatomaceous earths, silica sand, crushed basalt, quartz or granite; glass wool, rock wool, steel wool, asbestos, etc.

Any coalescer used should be regularly back washed with water. Significantly, it has been found that ordinary washing is not sufficient. The wash must be prolonged and a running stream must be employed. The wash should be continued for at least one hour and preferably more than two hours, and the wash water should flow through the coalescer at a space velocity of about 0.75 per hour.

The marked improvement obtainable by the use of my process is illustrated in the following example:

A sour gasoline from which mercaptans were to be extracted was treated with a 40° Bé. caustic soda solution to remove hydrogen sulfide and other relatively strong acids present. The separated gasoline was then contacted with a steel wool coalescer in a packed extraction tower, and then charged to a solutizer extraction system and extracted with an aqueous alkaline solution containing 6 gms. mole of potassium hydroxide and 3 gms. mole potassium isobutyrate per liter. During a two day operation the resulting solutizer treated gasoline had an average alkalinity of 0.0005% KOH by weight.

The coalescer was then washed with water for three hours by a stream flowing through it at a space velocity of 0.75 per hour. Whereupon the alkalinity of the solutizer treated gasoline dropped to 0.0002% KOH by weight.

I claim as my invention:

1. In a process of refining sour hydrocarbon distillates containing mercaptans and stronger acids by extraction with an aqueous alkaline solution containing a solutizer for mercaptans, in which process mercaptans are absorbed into the aqueous solution, thereby resulting in a spent solution which is regenerated by steam stripping, the improvement comprising treating said hydrocarbon distillate with an aqueous solution of caustic alkali free from solutizers, to produce a treated distillate and an alkaline aqueous layer containing absorbed acids stronger than mercaptans, separating said aqueous layer from said treated distillate, said separated distillate containing a small amount of residual alkaline water soluble impurities, separately removing said residual impurities from the separated distillate, and thereafter further treating the latter with said aqueous alkali solution containing solutizer.

2. In a process of refining sour hydrocarbon distillates containing mercaptans and stronger acids by extraction with an aqueous alkaline solution containing a solutizer for mercaptans, in which process mercaptans are absorbed into the aqueous solution, thereby resulting in a spent solution which is regenerated by steam stripping, the improvement comprising treating said hydrocarbon distillate with an aqueous solution of caustic alkali free from solutizers, to produce a treated distillate and an alkaline aqueous layer containing absorbed acids stronger than mercaptans, separating said aqueous layer from said treated distillate, said separated distillate containing a small amount of residual alkaline water-soluble impurities, contacting the separated distillate with water substantially free from metal ions to remove said residual impurities from said distillate and thereafter further treating the latter with said aqueous alkali solution containing solutizer.

3. The process of claim 2 wherein the water contains not more than 5% of a mineral acid having an oxidation potential not greater than that of sulfuric acid.

4. In a process of refining sour hydrocarbon distillates containing mercaptans and stronger acids by extraction with an aqueous alkaline solution containing a solutizer for mercaptans, in which process mercaptans are absorbed into the aqueous solution, thereby resulting in a spent solution which is regenerated by steam stripping, the improvement comprising treating said hydrocarbon distillate with an aqueous solution of caustic alkali free from solutizers, to produce a treated distillate and an alkaline aqueous layer containing absorbed acids stronger than mercaptans, separating said aqueous layer from said treated distillate, said separated distillate containing a small amount of residual alkaline water-soluble impurities, contacting the separated distillate with a solid adsorbent to remove said residual impurities from said distillate and thereafter further treating the latter with said aqueous alkali solution containing solutizer.

5. In a process of refining sour hydrocarbon distillates containing mercaptans and stronger acids by extraction with an aqueous alkaline solution containing a solutizer for mercaptans, in which process mercaptans are absorbed into the aqueous solution, thereby resulting in a spent solution which is regenerated by steam stripping, the improvement comprising treating said hydrocarbon distillate with an aqueous solution of caustic alkali free from solutizers, to produce a treated distillate and an alkaline aqueous layer containing absorbed acids stronger than mercaptans, separating said aqueous layer from said treated distillate, said separated distillate containing a small amount of residual alkaline water-soluble impurities, contacting the separated distillate with a water-prewetted substantially inert solid substance to remove said residual impurities from said distillate and thereafter further treating the latter with said aqueous alkali solution containing solutizer.

6. In a process of refining sour hydrocarbon distillates containing mercaptans and stronger acids by extraction with an aqueous alkaline solution containing a solutizer for mercaptans, in which process mercaptans are absorbed into the aqueous solution, thereby resulting in a spent solution which is regenerated by steam stripping, the improvement comprising treating said hydrocarbon distillate with an aqueous solution of caustic alkali free from solutizers, to produce a treated distillate and an alakline aqueous layer containing absorbed acids stronger than mercaptans, separating said aqueous layer from said treated distillate, said separated distillate containing a small amount of residual alkaline water-soluble impurities, contacting the separated distillate with a water-prewetted substantially inert solid substance to remove said residual impurities, thereafter further treating the distillate with said aqueous caustic alkali solution containing a solutizer, and periodically washing said solid substance with water.

7. In a process of refining sour hydrocarbon distillates containing mercaptans and stronger acids by extraction with an aqueous alkaline solution containing a solutizer for mercaptans, in which process mercaptans are absorbed into the aqueous solution, thereby resulting in a spent solution which is regenerated by steam stripping, the improvement comprising treating said hydrocarbon distillate with an aqueous solution of caustic alkali free from solutizers, to produce a treated distillate and an alkaline aqueous layer containing absorbed acids stronger than mercaptans, separatiing said aqueous layer from said treated distillate, said separated distillate containing a small amount of residual alkaline water-soluble impurities, washing the separated distillate with water substantially free from metal ions to remove residual impurities, then contacting the washed distillate with a water-prewetted substantially inert solid substance and thereafter further treating the contacted distillate with said aqueous alkali solution containing solutizer.

LAWSON E. BORDER.